Patented June 8, 1926.

1,588,384

UNITED STATES PATENT OFFICE.

RICHARD HERZ, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

QUINONE VAT DYESTUFF, DYEING PARTICULARLY ANIMAL FIBERS IN THE VAT FAST SHADES, AND PROCESS OF MAKING SAME.

No Drawing. Application filed May 13, 1924, Serial No. 713,024, and in Germany May 19, 1923.

I have found that a new class of very valuable dyestuffs belonging to the quinone vat dyestuff series results by condensing arylaminoderivatives of o aminoarylmercaptans of the following general formula:

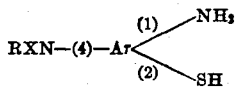

(wherein Ar and R denote an arylgroup, which may or may not otherwise contain substituents, X indicates hydrogen which may be substituted by alkyl or aralkyl, and in which the group NXR stands in $p$ position to NH$_2$) with arylquinones and substitution products thereof, particularly with halogenated arylquinones. These dyestuffs contain in their molecule very probably a thiazine nucleus; they form with an alkaline hydrosulfite solution, weakly coloured vats and dye, especially animal fibers in such a vat, various shades, fast to washing, milling and light, distinguished by their unusual brightness. The starting materials for the production of these colours, the ($p$) arylaminoderivatives of o aminoarylmercaptans may, for instance, advantageously be produced as follows.

The products of reaction of disulfurdichloride on aromatic aminocompounds described in British specification No. 17,417 of 1914, hereinafter referred to as "arylenthiazthioniumchlorides" of the following probable constitutional formula:

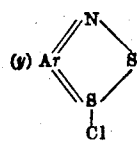

in which the $p$ position to the N atom of the side chain (indicated in the formula by $y$) is substituted by a labile substituent such as chlorine, or the oxyalkyl group, if condensed with an arylamino compound containing in its molecule at least one primary or secondary amino group, produce new products of condensation, of the following probable general formula:

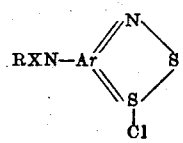

wherein Ar and R indicate an arylgroup, which may, or may not otherwise contain substituents and X indicates hydrogen, which may be substituted by an alkyl or aralkyl group. By subjecting these products of condensation to the action of alkalies with or without the addition of a suitable reducing agent, the "thiazthionium ring" is split arylamino-derivatives of o. aminoarylmercaptans result, possessing probably the following general structural formula:

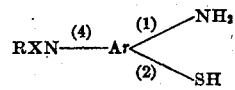

wherein Ar and R denote an arylgroup, which may, or may not otherwise contain substituents.

X indicates hydrogen which may be substituted by alkyl, or aralkyl and in which the group NXR stands in $p$ position to NH$_2$.

In place of the arylamino derivatives of o aminoarylmercaptans an obvious equivalent thereof, which during the reaction is converted into a mercaptan may be used as for instance a corresponding substituted o aminoarylthiosulfonic acid, or a substituted o o diaminoaryldisulfide. The same dyestuffs are obviously obtained by simultaneous oxidation of these mercaptans and equivalents thereof with an arylhydroquinone and halogen derivative thereof with a suitable oxidation agent, with or without the addition of a catalyzer.

The methods of working the inventions are illustrated by the following examples.

48 kilos of the (3) methyl (5) chloro-1.2 phenylenethiazthioniumchloride, (the product of reaction of disulfurdichloride on o toluidine described in British specification No. 17,417 of 1914) are introduced at ordinary temperature whilst stirring well into a mixture of 41 kilos aniline and 60 to 70 kilos of glacial acetic acid. The reaction begins at once and after some hours' stirring the product of condensation almost completely separates in form of crystal needles with a metallic lustre. It is filtered, washed with dilute salt solution, and may thus directly be used in the process of working. Its chemical constitution may be expressed as follows:

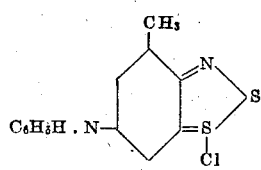

The same product of condensation is obtained in an excellent yield if in this process the (3) methyl (5) methoxy-1.2 phenylenethiazioniumchloride (derived from the action of disulfurdichloride on the (1) methyl (2) amino (5) methoxybenzene) is condensed with aniline, and similar products of condensation result, if in these processes the aniline is replaced by its homologues and derivatives.

A paste corresponding to 15 kilos of the products of condensation (produced as described above) is mixed with 4 to 5 times its quantity of water or diluted spirit, and then gradually introduced whilst stirring into a caustic soda solution containing about 12 to 15 kilos sodiumhydroxide and preferably 5 to 10 kilos of sodiumhydrosulfite; it is warmed to 30-50° C., and stirred for some hours. When the reaction is finished the whole is decolorized and dissolved; it is freed from some impurities by filtering and the mercaptan formed is precipitated in form of its whitish coloured zincmercaptide by adding a solution of chloride of zinc. Its chemical constitution corresponds very probably to the following formula:

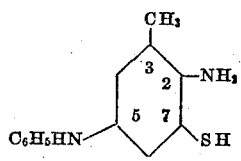

A paste of this zincmercaptide corresponding to 23 kilos pure (3) methyl (5) phenylamino-2.1 aminothiophenol is mixed with about 5 to 10 times its quantity of spirit, or acetic acid, and 30 to 36 kilos of chloranil are added; the whole is stirred for some hours at ordinary temperature, then gradually heated to the boiling point and kept at this temperature for some hours. It is then cooled down, acidified with a mineral acid and the precipitated dyestuff then filtered, washed and dried.

In a dry state it forms a dark-blue powder with a metallic lustre, soluble in hot nitrobenzene with a reddish blue colour, soluble in concentrated sulfuric acid with a pure blue colour, forming with an alkali hydrosulphite solution a yellowish vat from which, especially wool, is dyed bright violet-blue shades, fast to washing, milling and light. Similar dyestuffs result, if in this example the chloranil is replaced by the corresponding amount of dichloro-or trichlorobenzoquinone, whereas benzoquinone if subjected to the same reaction produces a dyestuff of a somewhat more reddish tint. Analogous dyestuffs dying animal fibers indigo blue to greenish blue shades are for instance obtained by condensing the above named, benzoquinone derivatives with the (3) methoxy (5) phenylamino-2.1 aminothiophenol (obtained from the product of reaction of disulfurdichloride on o anisidine by condensing it with aniline, and subsequent reduction). Greyish-blue to black dyeing vat dyestuffs result if the (1) amino (4) phenylamino (2) thionaphthol (derived from the product of reaction of disulfurdichloride on α naphthylamine by condensing it with aniline and subsequent reduction) is condensed with β hydroxy α naphthoquinone, or the 2.3 dichloro-α naphthoquinone, preferably in a concentrated sulfuric acid solution. The reaction may also be varied by using instead of the mercaptans the corresponding o aminoarylthiosulfonic acids or o o diaminodiaryldisulfides.

The same dyestuffs result by mixing in equimolecular proportions an aqueous alkaline solution of one of the above named mercaptans or thiosulfonic acids with a hydroquinone of the benzene or naphthalene series, or a halogen derivative thereof adding a suitable catalyzer to it, and allowing a stream of air to pass through the mixture until the formation of the dyestuff is finished.

Having now particularly described and ascertained the nature of my said invention, and in what manner the same is to be performed I declare what I claim is:

1. The herein described process for the manufacture of fast quinone-vat dyestuffs for dyeing especially animal fibers by condensing arylamino derivatives of o aminoarylmercaptans of the probable general structural formula:

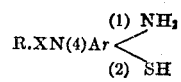

(wherein Ar and R denote an aryl group which may, or may not otherwise contain substituents, X indicates hydrogen which may be substituted by alkyl and aralkyl, and in which the group NXR stands in p position $NH_2$) with arylquinones in which the hydrogen atoms of the quinone nucleus may be substituted by halogen.

2. The herein described new fast quinone vat dyestuffs derived from arylamino derivatives of o aminoarylmercaptans of the following general formula:

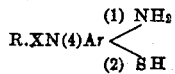

(wherein Ar and R denote an aryl group which may, or may not otherwise contain substituents, X indicates hydrogen, which may be substituted by alkyl and aralkyl, and in which the group NXR stands in $p$ position to $NH_2$) by condensing same with arylquinones in which the hydrogen atoms of the quinone nucleus may be substituted by halogen, containing in their molecule very probably a thiazine nucleus being in a dry state dark colored powders with a metallic lustre soluble in concentrated sulfuric acid with a violet to blue, to blackish color, forming with an alkali hydrosulphite solution a yellowish vat from which especially animal fibers are dyed various shades ranging from violet to blue to black, which are distinguished by their fastness to washing, milling, light and their unusual brightness.

3. As a new article of manufacture the herein described new fast quinone vat dyestuff derived from the (3) methyl (5) phenylamino-2.1 aminothiophenol by condensing it with chloranil, containing in its molecule very probably a thiazine nucleus, being in a dry state a dark blue powder, soluble in hot nitrobenzene with a reddish blue color, soluble in concentrated sulfuric acid, with a pure blue color, forming with an alkali hydrosulphite solution a yellowish vat from which especially wool is dyed bright violet blue shades which are distinguished by their fastness to washing, milling and light.

In witness whereof I have hereunto signed my name this 28th day of April 1924.

RICHARD HERZ.